United States Patent [19]
Rogers

[11] 3,717,749
[45] Feb. 20, 1973

[54] ELECTROMAGNET SENSOR STRUCTURE FOR MAGNETIC CARDS

[75] Inventor: Waldo I. Rogers, Arcadia, Calif.

[73] Assignee: Rusco Industries, Inc., Los Angeles, Calif.

[22] Filed: May 17, 1971

[21] Appl. No.: 143,979

[52] U.S. Cl.................................235/61.11 D, 235/61.12 M, 340/174.1 F
[51] Int. Cl......G06k 7/08, G06k 19/08, H01h 43/08
[58] Field of Search....................340/174.1 F, 149 A; 235/61.11 D, 61.12 M; 200/46; 179/6.3 CC; 194/4

[56] References Cited

UNITED STATES PATENTS

| | | |
|---|---|---|
| 3,626,396 | 12/1971 | Eastman..........................340/174.1 F |
| 3,271,751 | 9/1966 | Proebster.......................340/174.1 F |
| 3,521,258 | 7/1970 | Hurt...............................340/174.1 F |
| 2,590,091 | 3/1952 | Devol..............................235/61.11 D |
| 2,559,505 | 7/1951 | Hillier.............................235/61.11 D |
| 3,419,710 | 12/1968 | Mathews........................235/61.11 D |

OTHER PUBLICATIONS

Thornley, R. F. M.–"MAGNETIC HEAD" IBM Technical Disclosure Bulletin, Vol. 13, No. 7 pp. 1,870 December 1970

Primary Examiner—Thomas A. Robinson
Assistant Examiner—Robert M. Kilgore
Attorney—Perry E. Turner

[57] ABSTRACT

For sensing the polarity of a magnetized spot in a card, an electromagnetic sensor structure is shown in which a coil surrounds a strip of saturable core material of high initial permeability that saturates at a substantially higher flux density than that available from the spot. Pole pieces in the form of end caps are mounted on the ends of a cylinder on which the strip is located, and are in contact with the ends of the strip. The pole pieces are of such size that when a card spot is aligned with either, it intercepts all flux from the spot. The cross section of the strip is such that flux gathered by the pole piece adjacent the card spot is concentrated therein so as to substantially saturate the strip. With the sensor thus conditioned, a pulse applied to the coil causes the strip to remain saturated when the coil field aids the spot field, and to be driven away from saturation when the coil field opposes the spot field. Due to the effect of the strip on the change of inductance of the coil, the voltage drops across the coil in the aiding and opposing situations are significantly different in character, thereby to clearly distinguish between the polarity orientations of different spot fields aligned therewith.

5 Claims, 6 Drawing Figures

PATENTED FEB 20 1973
3,717,749
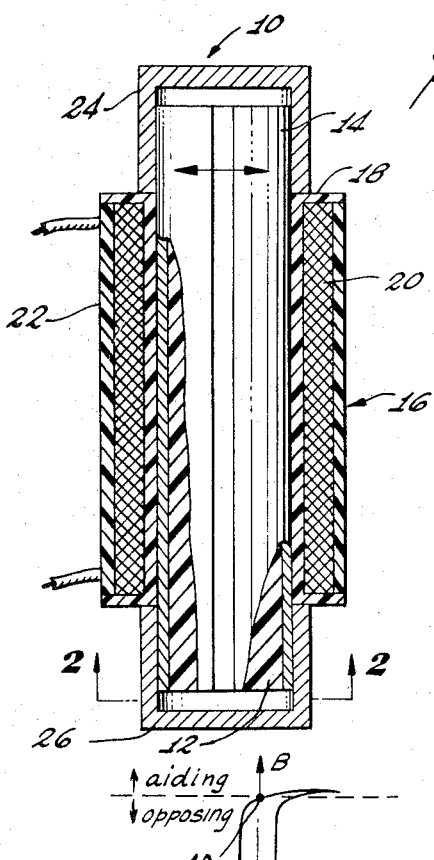
Fig.1
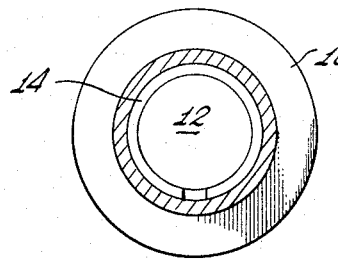
Fig.2
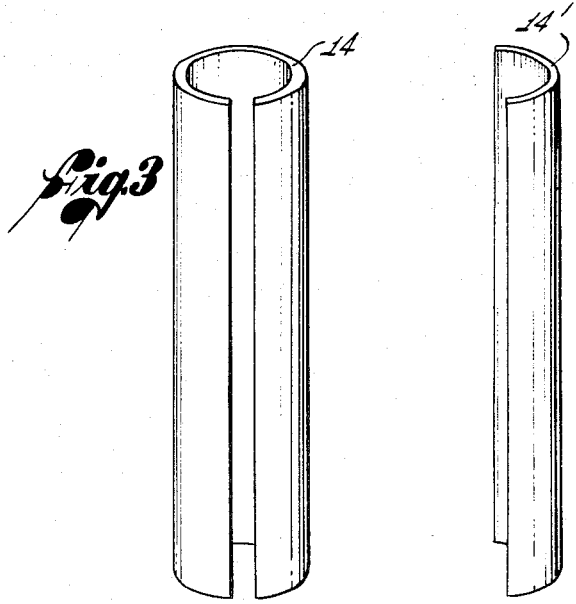
Fig.3
Fig.4
Fig.6
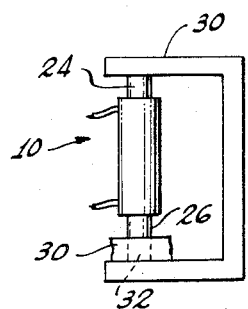
Fig.5
INVENTOR.
WALDO I. ROGERS
BY Perry E. Turner
ATTORNEY

ELECTROMAGNET SENSOR STRUCTURE FOR MAGNETIC CARDS

CROSS-REFERENCE TO RELATED APPLICATION

See "Static Reader System for Magnetic Cards," Ser. No. 143,978, filed concurrently herewith and assigned to the same assignee as the present application.

BACKGROUND OF THE INVENTION

1. Field of the Invention

This invention relates to electromagnetic devices for sensing the polarities of magnetic fields of spot magnets formed in a card.

2. Description of the Prior Art

The above-identified application discloses a system for reading a stationary magnetic card and utilizing stationary electromagnetic sensors wherein coils surround cores of high initial permeability that are substantially saturated by the fields of magnetized card spots aligned therewith. The coils are pulsed, so that the cores in coils whose fields oppose their card spots are driven away from saturation, and the cores in those coils whose fields aid their spot fields are fully saturated. The voltages across the aiding and opposing coils are significantly different in character, e.g., magnitude or phase, and correspond to the orientations of the associated spot fields. Such voltages are directly applicable to output means to develop high or low outputs depending upon the polarities of the spot fields, i.e., without resort to sense windings, drive windings and complex circuitry.

Sensors of this type have cores with center portions of extremely small cross section to be saturated from an external source (card spot) of insufficient flux density for that purpose. In this connection, the flux density of a spot in a magnetic credit card is significantly below that at which available sizes of known materials saturate. For example, in a card wherein barium ferrite is distributed throughout a rubber or plastic base, the flux density of a spot in an idealized closed magnetic circuit may be of the order of 3,000–4,000 gauss. Where such a magnetized spot is small, e.g., 0.125-in. diameter, the cross section of a core of desired characteristics in such a closed circuit must be extremely small, e.g., as a wire 0.01-in. in diameter, for a metal that saturates at 8,000 gauss. Grinding or otherwise machining saturable core materials to such small sizes is extremely difficult, and results in undesirably high rejection rates due to changes in their magnetic characteristics caused by machining operations, and to ease of breakage in machining or in assembly. Such problems become even more severe for core materials that saturate at higher flux densities, or in practical applications where air gaps are present, and cores in such cases must be made so they are even smaller in cross section.

Electromagnetic sensors are known which use films or strips of high permeability. However, in the only known arrangement that is adapted to function as a static sensor, use is made of strips and drive and sense windings in a circuit of undesirable complexity. The closest known art is U.S. Pat. No. 3,521,258 of J. G. Hurt, Jr., wherein such strips are used in pairs for developing signal indications of the polarities of spots in a card that are poled perpendicular to the card's surfaces. One strip of a pair is held normal to the card surface so as to be influenced by the field from a magnetized card spot, and the other strip is held so as to be unaffected by the spot field. Drive and sense windings are placed around both strips, with the drive windings in series aiding and the sense windings in series opposition. Energizing the drive windings places the strips at their operating points. The flux operating point of the strip aligned with a card spot is affected by the spot field, and the sense windings are interconnected so that an output signal across the two sense sense windings is of one sense if the spot is a north pole and of another if the spot is a south pole. Thus, since the cross section of a strip is so much smaller than that of a card spot, and since very little of the flux from the spot is able to pass through the strip, a relatively complex circuit arrangement is required for developing signals that represent the polarity of a spot.

SUMMARY OF THE INVENTION

This invention embraces an electromagnetic sensor wherein a magnetically saturable core element of high initial permeability is formed of a deformable sheet or strip that conforms to a support, with one flux gathering pole piece on the support contacting one end of the strip or with a pair of flux gathering pole pieces mounted on the support and contacting the respective ends of the strip, and a coil having a plurality of turns surrounding the support and strip. The strip is cut to the desired length and width from a sheet of material of the type that is used for magnetic shields. The strip and pole piece arrangement requires no machining, and facilitates assembly of parts with a minimum of labor and without breakage or changes in magnetic characteristics. Further, the strip is dimensioned so that it is substantially saturated by the field of a card spot aligned with one of its pole pieces, and functions when the coil is energized to cause such a substantial change of coil inductance when the coil field opposes the field of the card spot, relative to the change that occurs when the coil field aids the field of a spot, that the voltage across such coil is directly utilizable by a logic circuit to signify whether the spot is a north or a south pole.

BRIEF DESCRIPTION OF THE DRAWING

FIG. 1 is a longitudinal sectional view of a magnetic sensor in accordance with the invention;

FIG. 2 is a sectional view taken along the line 2—2 of FIG. 1;

FIG. 3 is a perspective view of the strip of saturable material mounted on the core of the sensor of FIG. 1;

FIG. 4 is a modified form of strip of saturable material suitable for use in the magnetic sensor of the invention;

FIG. 5 is a side elevation view of a sensor in a magnetic housing, to aid in explaining the utility of the invention for detecting the polarity orientation of a card spot; and FIG. 6, is a graph of the B–H curve of the strip for use in explaining the operation of a sensor of this invention.

DESCRIPTION OF ILLUSTRATIVE EMBODIMENTS

Referring to FIGS. 1–3 a magnetic sensor 10 is shown with a support element in the form of a cylinder 12 of nonmagnetic material, e.g., nylon. A sheet or strip 14 of saturable core material is placed on the cylinder 12, and is deformable to conform to the lateral surface of the cylinder. The maximum width of the strip 14 does not exceed, and preferably is less than, the circumference of the cylinder 12, and in the embodiment illustrated in FIGS. 1–3 there is a small gap between its edges when it is placed on the cylinder. The strip may be substantially narrower, e.g., as illustrated by the strip 14' in FIG. 4.

After the strip is assembled on the cylinder, a coil structure is slipped over the assembly. As shown in FIG. 1, such coil structure 16 includes a nonconductive bobbin 18 on which a coil 20 is wound and covered with a strip 22 of nonconductive material. Both the bobbin 18 and cover strip 22 may be formed of any suitable plastic. The inner diameter of the bobbin is such that the coil structure easily slides onto the core and strip assembly.

After the coil structure is in position, pole pieces are fitted on the ends of the coil and strip assembly. Such pole pieces are formed of magnetic caps 24, 26, e.g., soft iron, which are frictionally fitted into place, and in contact with the ends of the strip. Thus, the pole pieces engage the ends of the bobbin 18, whereby to hold the coil structure in place.

Novel aspects of a sensor structure in accordance with the invention will be explained in connection with FIGS. 5 and 6. FIG. 5 shows a channel-like housing 30 of magnetic material, e.g., soft iron, one wall of which is engaged by one pole piece 24 of the sensor 10. A card 32 is slidably positioned between the other pole piece 26 of the sensor and the opposite wall of the housing 30, and has a magnetized spot 32 aligned with the pole piece 26. The pole piece 26 confronted by the spot 32 is approximately the same diameter as the spot, e.g., 0.125-in., so as to intercept all the flux from the card spot.

Other exemplary dimensions of the sensor will aid in understanding this invention. In one example, the cylinder 12 is 0.59-in. in length, and 0.064-in. in diameter. The strip 14 is 0.150-in. wide and 0.002-in. thick, and is coextensive with the cylinder 12. The coil 20 is formed of 250 turns of No. 36 wire, and the outer diameter of the coil structure is approximately 3/16-in.

The material of the strip 12 in one example is mu-metal, and is cut from a sheet thereof such as is conventionally used to form a magnetic shield around circuits and components to prevent external magnetic fields from reaching them and adversely affecting their characteristics and functions. Such material has an extremely narrow, substantially vertical B–H loop (FIG. 6), and has a high initial permeability. Furthermore, it saturates at a flux density of the order of 8,000 gauss, but requires a very small amount of force to saturate it. For example for a strip of mu-metal that is magnetized in the direction of its granular orientation, a flux field analogous to less than 1 ampere turn is all that is required to saturate it. In fact, for a sensor for card spots of the size above described, this factor calls for a strip that is so narrow that it is too difficult to cut it accurately. In the above example, the strip is a mu-metal that has its granular orientation at right angles to the direction of the field of the card spot. Thus oriented, 2 or 3 ampere turns causes the strip to be saturated.

The card spot supplies the flux necessary to substantially saturate the strip, e.g., at the point 40 illustrated in FIG. 6. In this connection, in terms of ampere turns, the field of the spot is substantially greater than that required to saturate the strip. However, most of this field is distributed elsewhere than in the strip, i.e., is used to overcome the reluctances of the air gaps between the upper face of the card and the pole piece 26, between the lower face of the card and the confronting portion of the housing, and of the remainder of the circuit between the upper pole piece 24 and the lower surface of the card.

When the coil 20 is pulsed, the character of the current through it depends upon whether the field induced therein aids or opposes the field of the card spot 32. If it is aiding, the strip 12 is fully saturated substantially instantaneously upon application of the pulse, and the resulting changes of flux density in the strip and of coil inductance are small. If the coil field is opposing, the strip is driven away from saturation, with accompanying large changes of flux density in the strip and of coil inductance. Such change of coil inductance is a function of the length of the strip.

Thus, it will be seen that a sensor in accordance with this invention is readily suited for use in the system of the aforementioned copending application. It is a relatively simple matter to cut core strips of desired width and length from thin metal sheets, and without any grinding or other machining operations that might alter its magnetic characteristics, and to conform them to the surface of the nonmagnetic support. Since the coil structures are easily made in volume, as are the pole pieces, it will be seen that a sensor structure of this invention lends itself to volume production and assembly at low cost. The invention, of course, embraces any of the various types of metal sheets employed for magnetic shielding, e.g., those known as supermalloy, deltamax, hypernom, etc.

The magnetic housing in FIG. 5 is a physical means to complete the magnetic path between the upper end of the core and the lower end of the card spot. However, it is enough to make the lower wall a magnetic plate, and the rest of the housing nonmagnetic. In such case, the upper pole piece is eliminated. Thus, the path is completed through air between the metal plate and the high flux density end of the core. The coil structure is secured in place by suitable material bonding the bobbin to the cylinder or by a plastic cap in place of the upper pole piece.

I claim:

1. A static sensor comprising:
   a pole piece having a face adjacent and parallel to which one surface of a card is adapted to be placed,
      wherein the card has a spot that is magnetized perpendicular to the card surfaces and aligned with the pole face;
   an elongated element of saturable material of high initial permeability engaging and extending from said pole piece, and normal to the card,
      said material having a saturation flux density substantially higher than the existing flux density of the card spot, the cross section of said element being substantially smaller than that of the spot, said face of said pole piece being as large in surface area as the end of the spot adjacent thereto so that the flux from the spot is gathered by said pole piece, said pole piece being shaped so the flux gathered thereby is concentrated in the smaller cross section of said element to substantially saturate said element;

and a coil with a plurality of turns surrounding said element and adapted to be pulsed, said coil and element coacting when the coil is pulsed so that the field of the spot effects such a change in the coil inductance that the voltage across the coil is directly utilizable to indicate the polarity orientation of the spot field.

2. A sensor in accordance with claim 1, wherein said element is in the form of a strip.

3. A sensor in accordance with claim 1, including a rod-like nonmagnetic support member, said element being a strip on said member and conforming to the lateral surface of said member, said pole piece being on one end of said member and frictionally engaging one end of said strip.

4. A sensor in accordance with claim 3, including a similar pole piece on the other end of said member and engaging the other end of said strip, said coil surrounding said strip and member.

5. A sensor in accordance with claim 4, wherein said strip is mu-metal having its granular orientation at right angles to its length.

* * * * *